July 29, 1941.  H. E. MORTON  2,250,594
CUTTING MACHINE
Filed Sept. 21, 1939    2 Sheets-Sheet 2
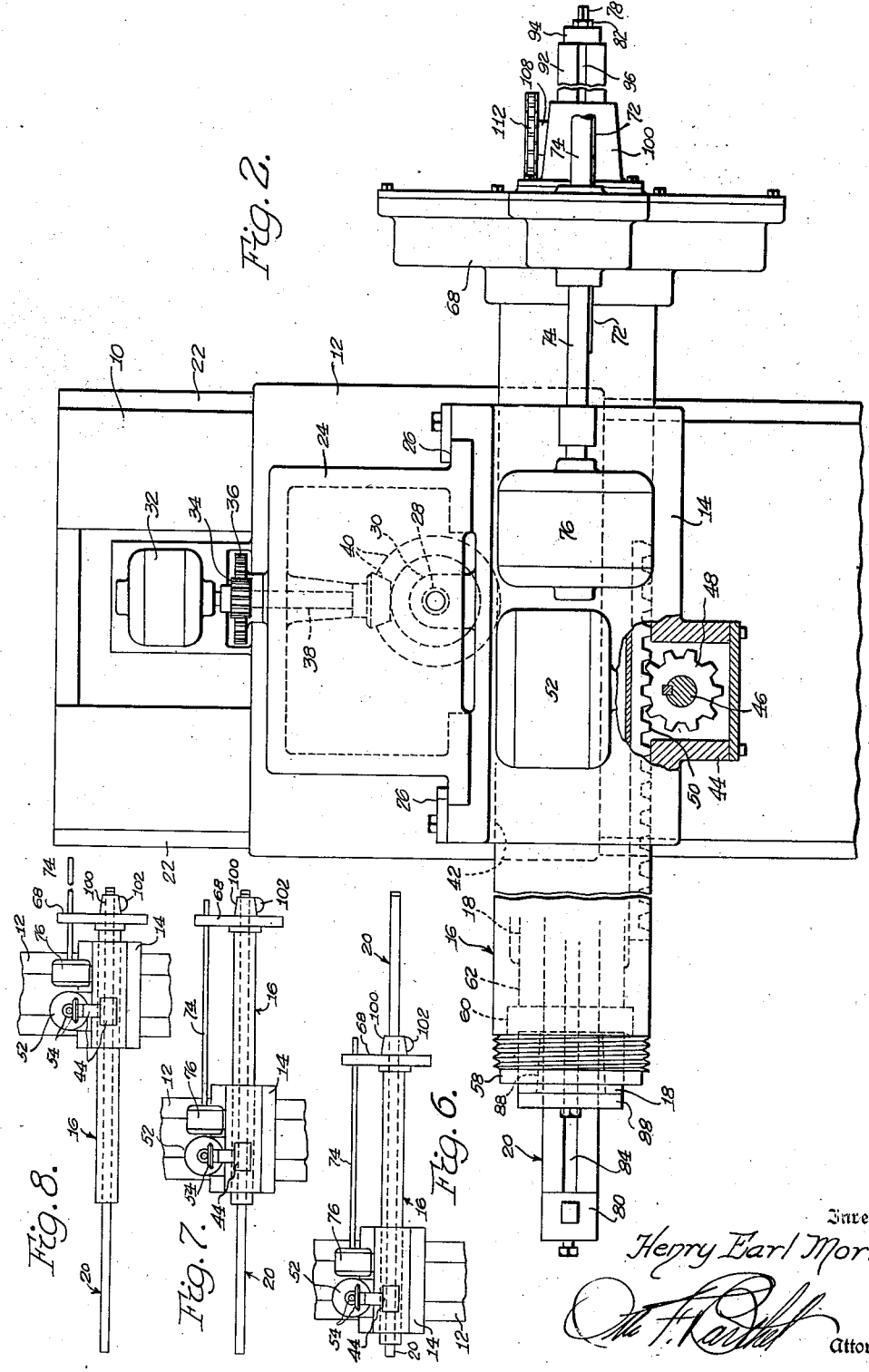
Inventor
Henry Earl Morton,
Attorney Patented July 29, 1941

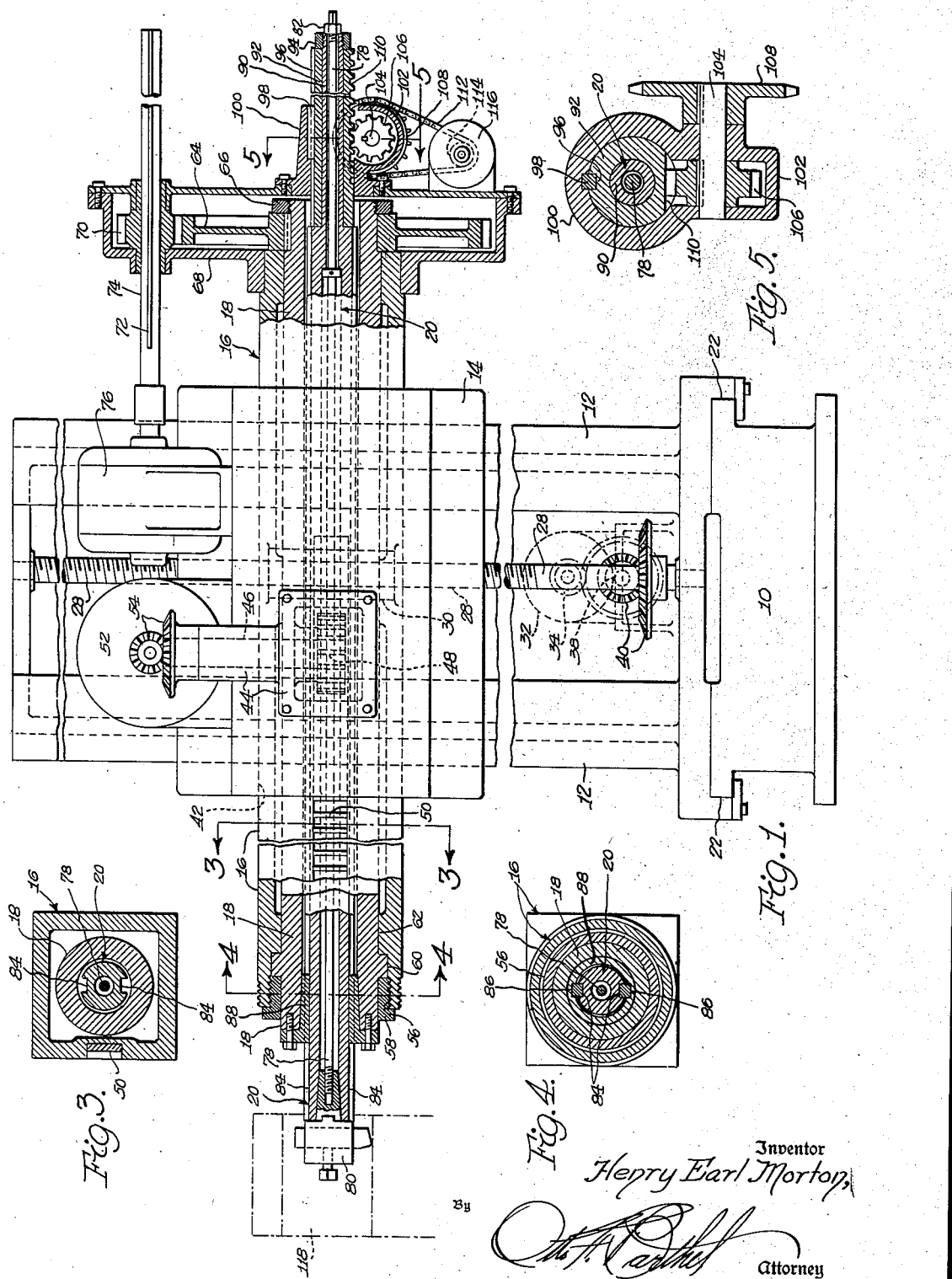

2,250,594

UNITED STATES PATENT OFFICE 2,250,594

CUTTING MACHINE

Henry Earl Morton, Muskegon Heights, Mich.

Application September 21, 1939, Serial No. 295,877

7 Claims. (Cl. 29—26)

This invention relates, in general, to cutting machines and, in particular, to a new and improved tool supporting structure therefor.

One of the objects of this invention is to provide a cutting machine with a new and improved tool supporting structure which is stronger and more rigid than heretofore because of the novel manner in which it is supported and operated and which is more useful than heretofore because it is not limited in the size of the work to be done thereby to the size of the structure carrying the tool for doing the work.

Another object is to provide a new and improved cutting machine wherein the arrangement of and relation between its parts give rise to a greater operating efficiency and a wider scope of utility than heretofore.

Another object is to provide a new and improved cutting machine wherein the torsional stresses to which the rotating parts are subjected are minimized.

Another object is to provide a new and improved cutting machine wherein the extensibility of the actual tool-carrying element from its support is maximized and the heretofore dependence of the size of the work upon the size of said support alleviated.

Still other objects and advantages of the invention will become readily apparent from a reference to the following specification taken in conjunction with the accompanying drawings of which there are two (2) sheets and wherein:

Figure 1 is a side elevational view of the cutting or boring machine and is partly broken away and in section in order to illustrate more clearly some of the details of the invention;

Fig. 2 is a top plan view of the showing in Fig. 1 and is also partly broken away and in section to show more clearly some of the details of construction;

Figs. 3, 4 and 5 are sections taken along the lines 3—3, 4—4 and 5—5, respectively, in Fig. 1; and Figs. 6, 7 and 8 are diagrammatical views of the machine assembly with its ram and tool-carrying spindle in different relative positions.

The cutting or boring machine which is shown in the figures comprises, in general, a base 10, a vertical column 12, a saddle 14, a ram, generally indicated at 16, an arbor 18, and a spindle, generally indicated at 20.

The base 10, either a stationary or a mobile structure, is preferably elongated in a direction transverse to the axis of reciprocation of the ram 16 so as to support the vertical column 12 for selective movement longitudinally of said base, such as by means of inter-engageable guides 22 formed on said base and said column. The mobility of the base 10, if provided, and the mobility of the column 12 with respect to said base naturally facilitate the positioning of the machine proper and the ram 16 thereof as close to the work as possible, and this is desirable.

The vertical column 12, which is slidably supported by the base 10 at the guides 22 for horizontal movement relatively thereto, is integrally provided with a vertically upstanding bifurcated supporting structure 24 which supports the saddle 14 and enables selective, vertical slidability of said saddle relatively to said column, such as by means of inter-engageable guides 26 formed on said bifurcated structure and said saddle. This arrangement is shown clearly in Fig. 2.

What provision is made for vertically moving the saddle 14 relatively to the bifurcated structure 24 of the column 12 along the guides 26 is immaterial, but, for the sole purpose of illustration, one of the many possible arrangements is shown in the drawings. A vertical screw shaft 28 is arranged adjacent one side of the saddle 14 intermediate the guides 26 and is supported at its ends in suitable bearings provided therefor in the upper and lower portions of the column 12. An internally threaded boss 30, integrally formed on the saddle 14 and in driven engagement with the shaft 28 intermediate the ends of the latter, provides the vertical drive for said saddle when said shaft is rotated. A motor 32, stationarily mounted on and at the base of the column 12 and having selective speeds and directions of drive shaft rotation, furnishes the drive for the screw shaft 28 by means of a pinion 34 mounted on and for rotation with the motor shaft, a gear 36 in constant mesh with said pinion and mounted on and for rotation with one end of a horizontal shaft 38 carried by said column for rotation about its axis, and a pair of constantly inter-meshed bevel gears 40, one of said bevel gears being mounted on and for rotation with the opposite end of said horizontal shaft, and the other of said bevel gears being mounted on and for rotation with said screw shaft.

The saddle 14, which is slidably supported by the column 12 at the guides 26 for vertical movement relatively thereto, is formed therethrough with a horizontal supporting guideway 42 in which is slidably supported the ram 16. In order that the longitudinal axes of the ram 16 and the guideway 42 therefor may be permanently coincident, the fit therebetween should be sufficiently snug and the cross sections substantially similar. On the side of the saddle 14 opposite the boss 30 there is integrally formed a gear and shaft housing 44 in which are enclosed for unitary movement about their vertically aligned axes a shaft 46 and a pinion 48 mounted on and for movement with one end of said shaft. The pinion-carrying portion of the housing 44 is open to the guideway 42 opposite a horizontal rack section 50 which is fixedly carried by and extends longitudinally along the ram 16, and in driving mesh with said rack section is the pinion 48. The opposite end of the shaft 46, externally of the housing 44, and the end of the drive shaft of a motor 52 carry, for rotation therewith, intermeshed bevel gears 54, said motor being mounted on the saddle 14 for vertical movement therewith and having selective speeds and directions of drive shaft rotation, similarly as the motor 32, whereby the ram 16 may be moved horizontally back and forth along and relatively to the guideway 42 in said saddle.

The ram 16, which is carried within and horizontally movable back and forth relatively to the guideway 42 in the saddle 14, is hollow and preferably but not necessarily rectangular in outer and inner transverse configurations for the greater part of its length. Since one of the purposes of the ram 16 is to support therewithin the arbor 18 for rotation about the axis of the latter, the internal surface of said ram itself may serve as the partial source of radial bearing support for said arbor, as shown, or separate bearings (not shown) may be provided, the result in either case being the disposition of said rotatable arbor within said ram with its axis coincident with the axes of said ram and the guideway or bore 42. It is desirable that the arbor 18 be prevented from longitudinal movement relatively to the ram 16, and, purely for the purpose of illustration, said ram, at its forward end, is internally cylindrical and threaded thereat, as at 56, to receive an externally threaded bearing 58 which abuts an annular enlargement 60 on said arbor to serve as a thrust bearing therefor and which, internally thereof, externally supports the end of said arbor to serve as a radial bearing therefor. The enlargement 60 on the arbor 18 may, to complete thrust prevention of said arbor in either direction relatively to the ram 16, abut one of the bearing portions 62 (if provided) on said ram for said arbor. In any event, the ram 16 supports the arbor 18 for rotation relatively thereto and for longitudinal movement therewith.

Except for the enlargement 60 the arbor 18 is substantially tubular throughout its length and extends for a short distance beyond the ram 16 at the end of the unit 16—18 opposite the bearing 58, this extension of said arbor being reduced in external diameter to support thereon in keyed relation therewith a gear 64 the hub of which abuts the adjacent end of said ram and which hub is held in said abutment by means of a nut 66 in threaded engagement with said reduced end of said arbor. Naturally, the cooperation of the hub of the gear 64 with the ram 16 and arbor 18 and the cooperation of the nut 66 with said hub and said arbor tend to aid the bearing 58 in absolutely preventing longitudinal movement of said arbor relatively to said ram, but the main purpose of said gear is to rotate said arbor and the main purpose of said nut is to hold said gear in place on said arbor.

The gear 64, which is keyed to the reduced end of the arbor 18 for rotating same, is confined within a housing 68 rigidly supported on the ram 16 for movement therewith, said gear being in driven mesh with a pinion 70 carried within said housing for rotation about an axis in parallelism with the axis of said gear. The hub of the pinion 70 is hollow and formed to receive an elongated key 72 carried on an elongated, horizontal shaft 74 which is in mechanically driven connection with a motor 76 mounted on the saddle 14, said motor being vertically movable with said saddle and having selective speeds and directions of rotation, similarly as the motors 32 and 52. The key 72 on the shaft 74 rotatably drives the pinion 70 and at the same time permits the unitary, longitudinal movement of the housing 68, pinion 70, gear 64, arbor 18 and ram 16 relatively thereto when it is desired to operate the motor 52 to protract or retract the ram-arbor unit 16—18 relatively to the saddle 14.

The elongated, reciprocable ram 16 carries the elongated, reciprocable and rotatable tubular arbor 18, and the latter carries the spindle 20. The length of the spindle 20 is longer than that of the arbor 18 because it is intended to move the former longitudinally relatively to the latter toward and from the work. The spindle 20 is preferably cylindrical so as to receive therewithin the usual elongated draw-rod 78 which extends through said spindle and is threaded at one of its ends to receive the shank of a tool holder 80 and is threaded at the other of its ends to receive a nut 82, whereby the tightening of said nut against the adjacent end of said spindle draws said tool holder firmly into place against the opposite end of said spindle, said shank being preferably externally tapered and the end of said spindle receiving it being similarly and complementarily tapered, and the tool carried by said holder being any one of a various number of forms, such as for planing, boring, drilling, milling, broaching or other form of cutting. It is to be pointed out that this discussion regarding the holding of the tool to the spindle 20 is purely illustrative, same constituting no part of the invention and, therefore, being subject to modification at will without departing from the inventive scope. The external diameter of the spindle 20 is slightly less than the internal diameter of the arbor 18 so that the former may be slidably received within the latter, the external surface of said spindle being formed with a pair of diametrically opposite key-ways 84 which extend from the tool-carrying end of said spindle to within a short distance of the opposite end thereof, said key-ways receiving keys 86 integrally formed on the internal surface of an externally tapered sleeve 88 which fits into the tapered, forward end of the arbor 18 and is secured thereto for providing a driving connection between said arbor and said spindle as well as a sliding, radial bearing for the latter. In other words, the spindle 20 is rotatably driven by and with the arbor 18 from a point outermost or forwardmost on said arbor, through the sleeve 88 and connection 84—86, thereby minimizing the torsional deflections of said arbor and said spindle when the ram 16 and/or said spindle are in their extended positions, such as in Figs. 7 and 8, the extensibility of said spindle from said arbor being permitted by said connection 84—86 and permitting the cutting operation to be performed not only at an extended distance from the ends of said ram and arbor but within bores of much smaller size than the outer size of either said ram or said arbor.

The end of the spindle 20 opposite the tool-carrying end thereof is reduced in diameter, as at 90, and arranged thereon is an elongated sleeve 92 which at one end abuts the shoulder on said spindle formed by said reduction (whereat the key-ways 84 terminate) and is held in place by a nut 94 tightened onto said spindle against said sleeve at its opposite end. The sleeve 92 moves longitudinally with the spindle 20 but is prevented from rotating therewith by means of an elongated key-way 96 formed therein and cooperable with a key 98 carried by the bore of a boss 100 stationarily mounted on the housing 68, said boss not only preventing rotation of said sleeve but providing a bearing therefor, said sleeve, of course, providing a bearing for said spindle.

The boss 100 is integrally formed to provide a gear casing 102 in which is journalled a shaft 104 for rotation about a transverse, horizontal axis, said shaft carrying thereon, within said casing, a pinion 106 and, without said casing, a sprocket wheel 108. The pinion 106 is in mesh with a rack section 110 formed or provided on the non-rotatable sleeve 92, and, so as to move said sleeve longitudinally and, in turn, move the spindle 20 longitudinally relatively to the arbor 18 and ram 16, the wheel 108 is driven through a chain 112 by a sprocket wheel 114 mounted on the drive shaft of a motor 116 carried on the housing 68, said motor, like the motors 32, 52 and 76, having selective speeds and directions of rotation so that said spindle may be longitudinally moved in either direction at any desired speed.

The cutting machine shown in the drawings may, therefore, be moved as closely as is desired to the work, which may be a piece 118 requiring a boring operation. The ram 16, arbor 18 and spindle 20 may then be moved even closer to the work, as a unit, or the spindle may be moved relatively to said ram and arbor. The arbor 18 is rotated relatively to the ram 16 and rotatably drives the spindle 20 from a point at the working end of said arbor, thereby providing a better support for said spindle while in extended position and minimizing the torsional deflections of said arbor and spindle which are both necessarily lengthy units and would, because of their lengths, be otherwise subject to torsion and its accompanying stresses. The extensible and rotatable spindle, which carries the cutting tool, is itself movable into the bore relatively to the ram 16 and arbor 18 wherein the cutting work is to be done, thus enabling said bore to be of much smaller diameter than the distance across the outer corners of either said ram or said arbor.

Although the invention has been described with some detail it is not intended that such description is to be definitive of the limits of the inventive idea. The right is reserved to make such changes in the details of construction and arrangement of parts as will come within the purview of the attached claims.

What I claim is:

1. In a cutting machine, a vertical support, an elongated ram non-rotatably carried by said support and movable in the direction of its length relatively to said support, said ram having a longitudinal bore with an elongated arbor residing therewithin, said arbor being longitudinally movable with said ram and rotatable within said bore relatively thereto, said arbor having a longitudinal bore with an elongated spindle residing therewithin, a driving connection associating said spindle with said arbor for rotating said spindle with said arbor within said bore thereof, and means for moving said spindle in the direction of its length independently of the unitary movement of said arbor and said ram in the direction of their lengths.

2. In a cutting machine, a vertical support, an elongated ram non-rotatably carried by said support and movable in the direction of its length relatively to said support, said ram having a longitudinal bore with an elongated arbor residing therewithin, said arbor being longitudinally movable with said ram and rotatable within said bore relatively thereto, said arbor having a longitudinal bore with an elongated spindle residing therewithin, a driving connection associating said spindle with said arbor at an end of the latter for rotating said spindle with said arbor within said bore thereof, and means for moving said spindle in the direction of its length independently of the unitary movement of said arbor and said ram in the direction of their lengths.

3. In a cutting machine, a vertical support, an elongated ram non-rotatably carried by said support and movable in the direction of its length relatively to said support, said ram having a longitudinal bore with an elongated arbor residing therewithin, said arbor being longitudinally movable with said ram and rotatable within said bore relatively thereto, said arbor having a longitudinal bore with an elongated spindle residing therewithin, a driving connection associating said spindle with one end of said arbor for rotating said spindle with said arbor within said bore thereof, and a member non-rotatably carried on said spindle and cooperable with means for longitudinally driving said spindle relatively to said last mentioned bore independently of said arbor and said ram.

4. In a cutting machine, a hollow, non-rotatable longitudinally movable ram, a hollow arbor carried within said ram and longitudinally movable therewith, means for rotating said arbor relatively to said ram, a spindle carried within said arbor and operable at one end for supporting a tool, a driving connection between said arbor and said spindle for rotating the latter with the former, and means at the opposite end of said spindle for moving same in the direction of its length relatively to and independently of the longitudinal movement of said ram and said arbor.

5. In a cutting machine, a hollow, non-rotatable, longitudinally movable ram, a hollow arbor carried within said ram and longitudinally movable therewith, means for rotating said arbor relatively to said ram, a spindle carried within said arbor and operable at one end for supporting a tool, a driving connection between said spindle and one end of said arbor for rotating the former with the latter, and means at the opposite end of said spindle for moving same in the direction of its length relatively to and independently of the longitudinal movement of said ram and said arbor, said last mentioned means comprising a non-rotatable sleeve carried on said opposite end of said spindle and having a rack in mesh with a rotatably driven pinion.

6. A cutting machine having, a plurality of elongated, telescopically arranged supports consisting of an outer support, an inner support and an intermediate support, said outer support being non-rotatable, said outer and intermediate supports being unitarily movable rectilinearly in the direction of the lengths thereof, a sleeve non-rotatably carried by one end of said inner support the other end of which carries a cutting tool, drive means, means rectilinearly movable unitarily with said outer and intermediate supports relatively to said drive means and operatively interconnecting said drive means and said intermediate support for rotating the latter about an axis, means operatively connected to said sleeve for unitarily moving the latter and said inner support rectilinearly in the direction of said axis relatively to said outer and intermediate supports during operation of said second means, and means operatively interconnecting said intermediate and inner supports for rotating the latter unitarily with the former during operation of said third means.

7. A cutting machine having, a pair of elongated, telescopically arranged supports operable for unitary movement rectilinearly in the direction of the lengths thereof, the inner support of said pair being hollow and the outer support of said pair being non-rotatable, a third elongated support telescopically arranged within said inner support and operable for carrying a cutting tool at one end thereof and a non-rotatable sleeve at the opposite end thereof, drive means, means rectilinearly movable unitarily with said inner support and operatively interconnecting the latter and said drive means for rotating said inner support about a selected axis, means operatively connected to said sleeve for unitarily moving the latter and said third support rectilinearly in the direction of said axis and relatively to said first two supports, and means operatively interconnecting said inner support and said first mentioned end of said third support for rotating said third support unitarily with said inner support.

HENRY EARL MORTON.